United States Patent
Kawachi

(10) Patent No.: US 12,288,017 B2
(45) Date of Patent: Apr. 29, 2025

(54) SIMULATION METHOD FOR CHARACTERISTICS OF TRANSISTOR, SIMULATION METHOD FOR CHARACTERISTICS OF ELECTRONIC CIRCUIT INCLUDING TRANSISTOR, AND NONTRANSITORY RECORDING MEDIUM THAT STORES SIMULATION PROGRAM FOR CHARACTERISTICS OF TRANSISTOR

(71) Applicant: Wuhan Tianma Micro-Electronics Co., Ltd., Wuhan (CN)

(72) Inventor: Genshiro Kawachi, Kanagawa (JP)

(73) Assignee: Wuhan Tianma Micro-Electronics Co., Ltd., Wuhan (CN)

( * ) Notice: Subject to any disclaimer, the term of this patent is extended or adjusted under 35 U.S.C. 154(b) by 777 days.

(21) Appl. No.: 17/153,943

(22) Filed: Jan. 21, 2021

(65) Prior Publication Data

US 2021/0232746 A1 Jul. 29, 2021

(30) Foreign Application Priority Data

Jan. 24, 2020 (JP) ................................ 2020-009620

(51) Int. Cl.
*G06F 30/36* (2020.01)
*G06F 30/3312* (2020.01)
(Continued)

(52) U.S. Cl.
CPC ........ *G06F 30/367* (2020.01); *G06F 30/3312* (2020.01); *G06F 30/396* (2020.01);
(Continued)

(58) Field of Classification Search
CPC .. G06F 30/367; G06F 30/3312; G06F 30/396; G06F 2119/06; G06F 2119/12;
(Continued)

(56) References Cited

U.S. PATENT DOCUMENTS

| | | | |
|---|---|---|---|
| 2004/0243955 A1* | 12/2004 | Alpert | G06F 30/33 716/113 |
| 2012/0065920 A1* | 3/2012 | Nagumo | G01R 31/2621 324/762.01 |
| 2015/0192635 A1* | 7/2015 | Kniazev | H01L 22/14 324/762.01 |

FOREIGN PATENT DOCUMENTS

| | | | |
|---|---|---|---|
| JP | 2010062441 A | * | 3/2010 |
| JP | 2010171384 A | * | 8/2010 |

(Continued)

OTHER PUBLICATIONS

Michael Hack, et al., "Physical Models for Amorphous-Silicon Thin-Film Transistors and Their Implementation in a Circuit Simulation Program", IEEE Transactions on Election Devices, Dec. 1989, pp. 2764-2769, vol. 36, No. 12.
(Continued)

*Primary Examiner* — Brian S Cook
(74) *Attorney, Agent, or Firm* — Sughrue Mion, PLLC

(57) ABSTRACT

A simulation method includes a process of calculating a transient charge density $q_T$ of trapped charges after applying a voltage between a gate electrode and a semiconductor layer of a transistor, the charge density $q_T$ being calculated with a time variance of the charge density $q_T$ being expressed by a function obtained by superimposing multiple exponential functions having mutually different time constants.

7 Claims, 17 Drawing Sheets

(51) Int. Cl.
  *G06F 30/367* (2020.01)
  *G06F 30/396* (2020.01)
  *G06F 117/04* (2020.01)
  *G06F 119/06* (2020.01)
  *G06F 119/12* (2020.01)

(52) U.S. Cl.
  CPC ...... *G06F 2101/10* (2013.01); *G06F 2101/14* (2013.01); *G06F 2117/04* (2020.01); *G06F 2119/06* (2020.01); *G06F 2119/12* (2020.01)

(58) Field of Classification Search
  CPC ............. G06F 2117/04; G06F 2101/10; G06F 2101/14
  USPC ................................................ 703/14; 704/14
  See application file for complete search history.

(56) References Cited

FOREIGN PATENT DOCUMENTS

| | | | | |
|---|---|---|---|---|
| JP | 2013-080847 A | | 5/2013 | |
| JP | 2013131640 A | * | 7/2013 | |
| JP | 2014045050 A | * | 3/2014 | ............... F21K 9/20 |

OTHER PUBLICATIONS

Yuhei Oodate, et al., "Compact Modeling of the Transient Carrier Trap/Detrap Characteristics in Polysilicon TFTs" IEEE Transactions on Election Devices, Mar. 3, 2015, pp. 862-868, vol. 62, No. 3.

* cited by examiner

SIMULATION METHOD FOR CHARACTERISTICS OF TRANSISTOR, SIMULATION METHOD FOR CHARACTERISTICS OF ELECTRONIC CIRCUIT INCLUDING TRANSISTOR, AND NONTRANSITORY RECORDING MEDIUM THAT STORES SIMULATION PROGRAM FOR CHARACTERISTICS OF TRANSISTOR

CROSS-REFERENCE TO RELATED APPLICATION

This application claims the benefit of Japanese Patent Application No. 2020-009620, filed on Jan. 24, 2020, the entire disclosure of which is incorporated by reference herein.

FIELD

The present disclosure relates generally to simulation method for the characteristics of a transistor, a simulation method for the characteristics of an electronic circuit including the transistor, and a non-transitory recording medium that stores a simulation program for the characteristics of the transistor.

BACKGROUND

Typically, liquid crystal displays, organic electro luminescence (EL) displays, and similar display devices are fabricated by forming a semiconductor layer on a glass substrate, a plastic film substrate, or the like, and forming various types of electronic circuits including transistors in or on the semiconductor layer. It is difficult to form a single crystal semiconductor layer on a glass substrate, a plastic film substrate, or the like. As such, typically, a non-single-crystal (polycrystalline, amorphous, or the like) semiconductor layer containing many crystal defects is formed on a glass substrate, a plastic film substrate, or the like. Typically, a plurality of thin film transistors (TFT) formed from non-single-crystal semiconductor layers is mounted in a display device.

Simulation software called Simulation Program with Integrated Circuit Emphasis (SPICE) is widely used to design electronic circuits. A simulation model for a transistor called a compact model is needed to simulate the characteristics of electronic circuits that include transistors using this circuit simulator.

Examples of compact models used for Metal-Oxide-Semiconductor Type Field Effect Transistors (MOSFET) formed from single crystal semiconductor layers include the Berkeley Short-Channel IGFET Model (BSIM), the Hiroshima-Univ. STARC IGFET Model (HiSIM), and the like. Meanwhile, examples of known compact models for thin film transistors formed from non-single-crystal semiconductor layers include the models disclosed in Japanese Patent Application No. 2010-062441, Japanese Patent Application No. 2013-080847, and Non-Patent Literature 1 (IEEE Trans. Electron Devices, vol. 36, No. 12, pp. 2764-2769, 1989).

However, these compact models for thin film transistors do not reflect the non-quasi static effect (hereinafter referred to as "NQS effect") of trapped charges trapped in trapping states originate from the structural defects. The NQS effect is defined as the time delay phenomenon of the charge distributions in the channel to reach their thermal equilibrium values after changing the terminal voltages. The time for the trapped charge distribution to reach the thermal equilibrium is significantly longer than that of the free carrier charges. The delay time for the trapped charge distribution to reach thermal equilibrium is, for example, from a few seconds to a few tens of seconds.

Japanese Patent Application Publication No. 2010-171384 discloses a compact model for a MOSFET that reflects the NQS effect of free carrier charges. In Japanese Patent Application Publication No. 2010-171384, a model is constructed under the assumption that the free carrier charge density varies exponentially with time (has time dependence of first-order delayed response) until the free carrier charge density reaches equilibrium after voltage is applied to the MOSFET.

Non-Patent Literature 2 (IEEE Trans. Electron Devices, vol. 62, No. 3, pp. 862-868, 2015) discloses a compact model for thin film transistors that reflects the NQS effect of trapped charges. In Non-Patent Literature 2, the NQS effect of trapped charges is incorporated into the compact model for thin film transistors by applying the model disclosed in Japanese Patent Application Publication No. 2010-171384.

However, these compact models for thin film transistors that reflect the NQS effect of trapped charges cannot reproduce measured results in a satisfactory manner. This is due to the fact that a simple first-order delay function is not suitable for describing the NQS effect in the trapped charges.

SUMMARY

A simulation method for the characteristics of a transistor, the transistor including a semiconductor layer that includes a source and a drain that are separated from each other and a channel positioned between the source and the drain, and a gate electrode facing the channel of the semiconductor layer, the method comprising: a process (a) of calculating a thermal equilibrium trap charge density $Q'_T$, based on the Poisson's equation expressing a relationship between an electrostatic potential inside the channel and charges including free carrier charges and trapped charges trapped in trapping states in the channel, and on the law of charge neutrality applied to charges accumulated on the gate electrode and the channel; a process (b) of calculating a transient trap charge density $q_T$ after applying a voltage between the gate electrode and the semiconductor layer, in which assuming that a time variance of the transient trap charge density $q_T$ is expressed by a function obtained by superimposing multiple exponential functions having mutually different time constants; a process (c) of calculating a free carrier charge density $q_I$, based on the transient trap charge density $q_T$; and a process (d) of calculating a drain current $I_d$ flowing between the source and the drain, based on the free carrier charge density $q_I$.

It is to be understood that both the foregoing general description and the following detailed description are exemplary and explanatory and are not restrictive of this disclosure.

BRIEF DESCRIPTION OF THE DRAWINGS

A more complete understanding of this application can be obtained when the following detailed description is considered in conjunction with the following drawings, in which.

DETAILED DESCRIPTION

In the following, a simulation method for the characteristics of a transistor according to embodiments is described. Note that, typically, the following simulation method is written as a program so as to be readable by an ordinary computer such as a workstation, a personal computer, or the like. In particular, the simulation method is written so as to be usable as a compact model in the circuit simulator SPICE. Moreover, the desired characteristics of a transistor, and the characteristics of an electronic circuit including that transistor are simulated by causing a computer (in particular, the circuit simulator SPICE that is incorporated into that computer) to execute the written program.

Figure 1:
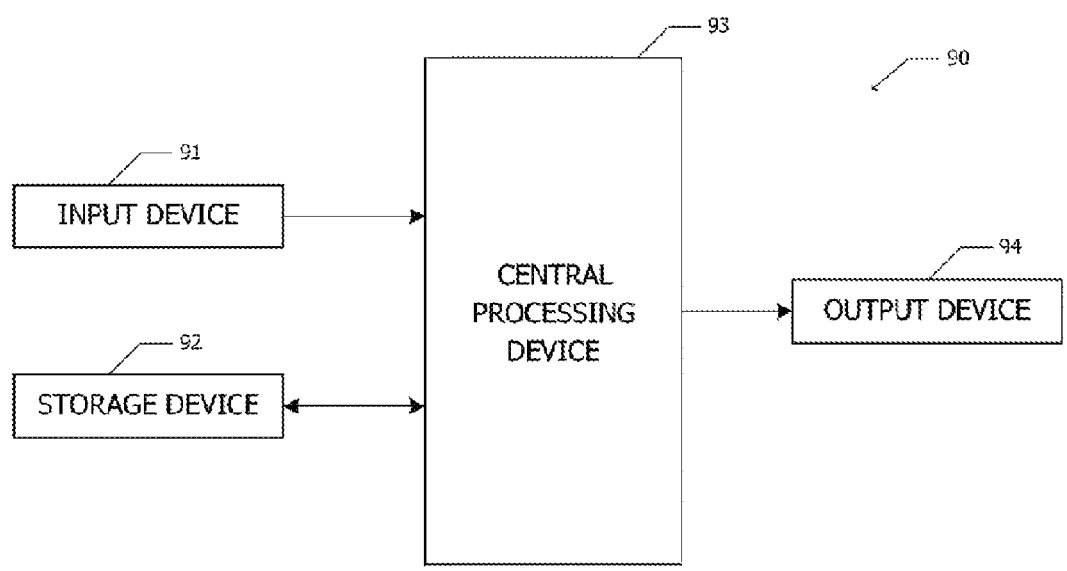
FIG. 1 is a block diagram illustrating the configuration of a typical computer.

FIG. 1 illustrates, in a simplified manner, the configuration of a typical computer. A computer 90 includes an input device 91, a storage device (memory) 92, a central processing device (CPU or central processing unit) 93, and an output device 94. These devices are connected commonly to a bus line (signal transmission path).

The input device 91 includes a keyboard, an operation panel, a sound input device, a variety of data reading devices, or the like, for example. Basic information required for the simulation, a circuit diagram (network topology) to be simulated, a compact model (mathematical model equation), and the like are input by the input device 91.

The storage device 92 includes a non-transitory recoding medium such as a flash memory and a hard disk. The various types of information input by the input device 91, programs related to the circuit simulator and a hereinafter described program corresponding to the simulation method, simulation results calculated in accordance with the program, and the like are stored in the storage device 92.

The central processing device 93 performs arithmetic processing in accordance with the various programs stored in the storage device 92. The central processing device 93 controls the various devices on the basis of the results of the arithmetic processing.

The output device 94 includes a monitor, a printer, an external storage device, or the like, for example. In one example, the output device 94 outputs (displays) the results (simulation results) of the arithmetic processing performed by the central processing device 93.

Figure 2:
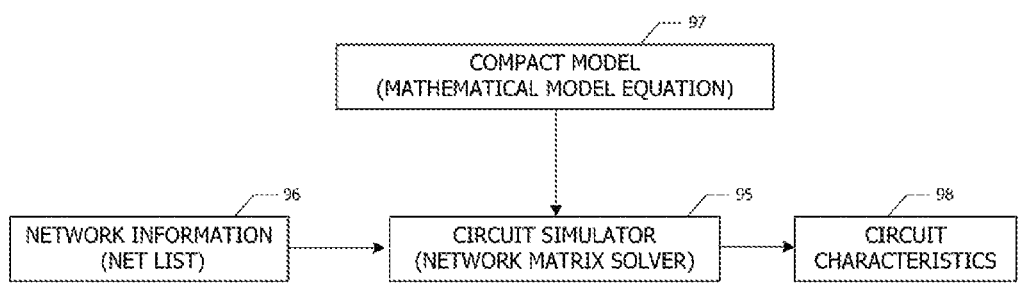
FIG. 2 is a flowchart illustrating the process flow of a circuit simulator.

FIG. 2 illustrates, in a simplified manner, the process flow of the circuit simulator (SPICE). A circuit simulator 95 is launched on the computer 90 illustrated in FIG. 1.

Information 96 about the network topology including various circuit elements (for example, the equivalent circuit of an organic EL display described later, and the like) is stored in the circuit simulator 95. This information is also called a "net list." The circuit simulator 95 solves network equations (nonlinear multidimensional simultaneous equations) corresponding to the network topology on the basis of Kirchhoffs Law. Specifically, the circuit simulator 95 calculates voltage values and current values of all the terminals (nodes) of the circuit elements of the network.

In a case in which the characteristics of an electronic circuit including a transistor are simulated, a compact model (mathematical model equation) 97 expressing the relationship between the terminal voltage and the terminal current of the transistor is incorporated into the network equation. Model parameters included in the compact model 97 are determined in advance on the basis of the measured results of the transistor. The circuit simulator 95 solves the network equation that incorporates the compact model to output a characteristic 98 (current waveform, voltage waveform, or the like) of the electronic circuit that includes the transistor.

Figure 3A:
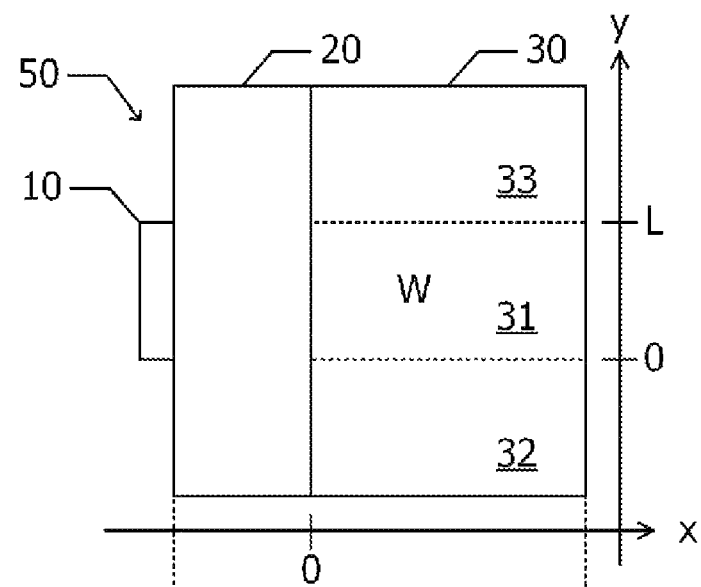
FIG. 3A is a cross-sectional drawing illustrating a transistor serving as a simulation model.
Figure 3B:
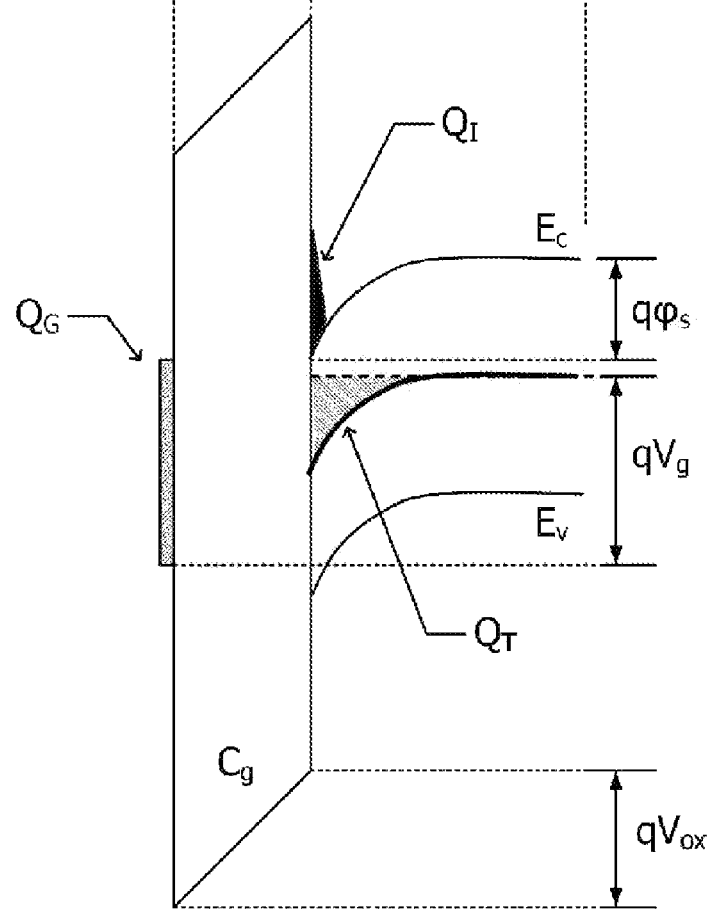
FIG. 3B is a schematic drawing illustrating an electrostatic potential distribution and a charge distribution in a semiconductor layer constituting the transistor.

FIG. 3A and FIG. 3B illustrate a simulation model of the transistor assumed in the present embodiment. FIG. 3A is a cross-sectional drawing schematically illustrating the structure of the transistor. FIG. 3B is a schematic drawing illustrating the electrostatic potential distribution and the charge distribution in the semiconductor layer (channel) when gate voltage is applied to the transistor.

As illustrated in FIG. 3A, a gate-insulated TFT, in which a semiconductor layer 30, a gate insulating film 20, and a gate electrode 10 are laminated, is assumed as the transistor 50 to be simulated. The semiconductor layer 30 has a structure in which a channel 31 is sandwiched between a low resistance source 32 and a drain 33. The gate electrode 10 is disposed opposite the channel 31 of the semiconductor layer 30. The gate insulating film 20 is disposed between the semiconductor layer 30 (the channel 31) and the gate electrode 10.

The semiconductor layer 30 is formed from a non-single-crystal semiconductor material that contains many crystal defects (trapping states). In one example, the transistor 50 constitutes an n-channel TFT. Note that, when assuming a p-channel TFT, it is sufficient to invert the following voltage and charge polarities.

A thickness direction of the semiconductor layer 30 is defined as the x direction (x-axis), and the position of the interface between the semiconductor layer 30 and the gate insulating film 20 is set as the origin of the x-axis. A direction in which the source 32, the channel 31, and the drain 33 are arranged is defined as the y direction (y-axis), and the position of the boundary between the source 32 and the channel 31 is set as the origin. The x-axis and the y-axis are orthogonal to each other, and a direction orthogonal to the x-axis and the y-axis is defined as the z direction (z-axis, non-illustrated). A length along the y-axis of the channel 31 is defined as L, and a width along the z-axis is defined as W.

As illustrated in FIG. 3B, when a voltage $V_g$ is applied between the gate electrode 10 and the semiconductor layer 30, the voltage applied to the gate insulating film 20 is defined as $V_{ox}$, and the voltage (also called the electrostatic potential in the semiconductor layer) applied to the semiconductor layer 30 (the channel 31) is defined as $\phi$. Note that the electrostatic potential on the surface (the interface with the gate insulating film 20) of the semiconductor layer 30 is defined as surface potential $\phi_s$.

Here, the charge density (charge quantity per unit volume) of the gate charges charged on the gate electrode 10 is defined as $Q_G$, the charge density of the free carrier charges induced in the semiconductor layer is defined as $Q_f$, and the charge density of the trapped charges is defined as $Q_T$. The capacitance (per unit area) of the gate insulating film 20 is defined as $C_g$.

Typically, the semiconductor layer 30 has a band structure that includes a valence band and a conduction band and an energy gap in-between them. Energy at the peak of the valence band is defined as $E_v$, and energy at the valley of the conduction band is defined as $E_c$.

The electrical characteristics, particularly the current (referred to as "drain current $I_d$") flowing between the source and the drain (in the channel), are simulated for the transistor described above.

Figure 4:
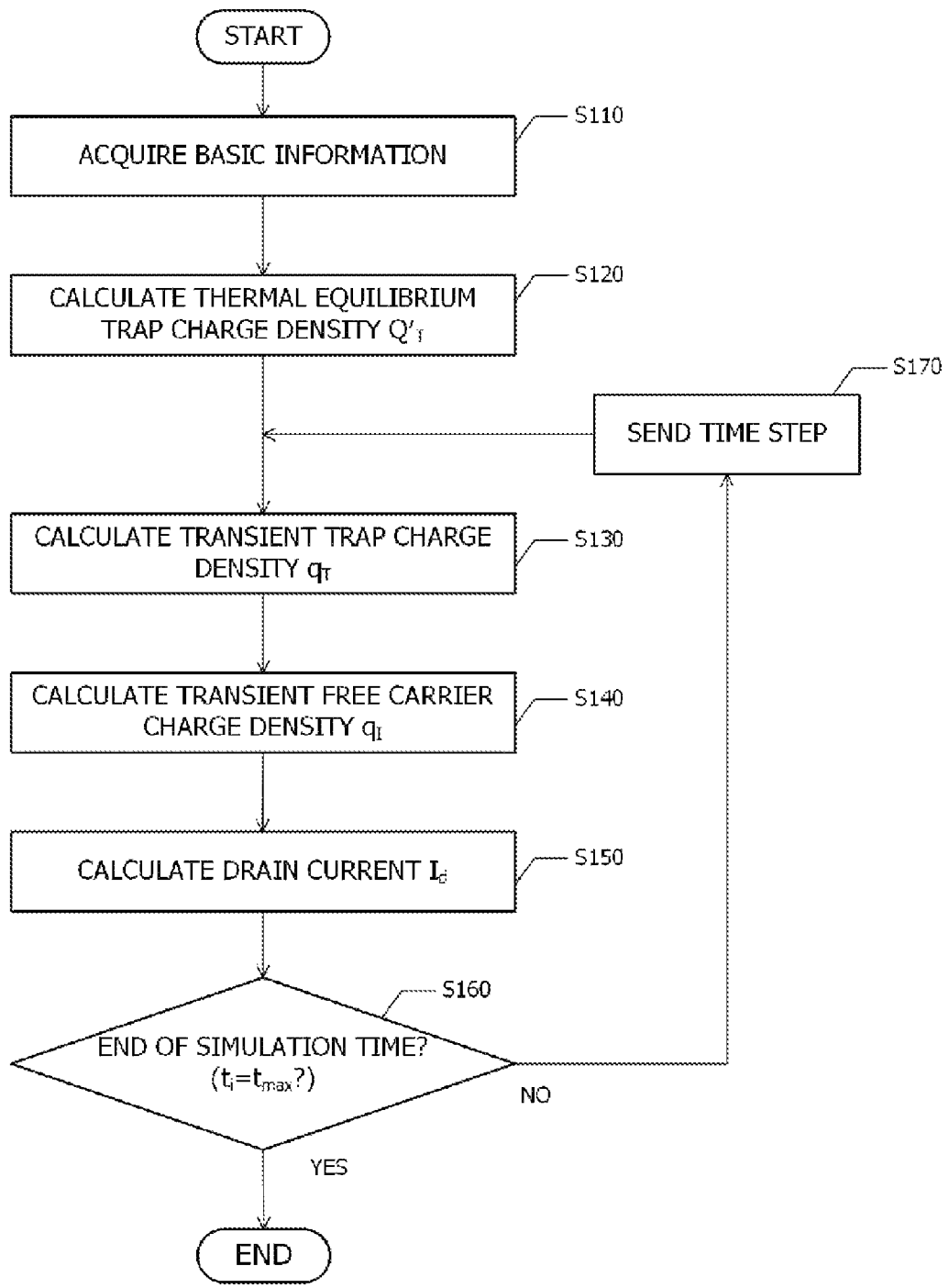
FIG. 4 is a flowchart of a simulation method for the characteristics of a transistor according to the present embodiment.

FIG. 4 illustrates the overall flow of the simulation method for the characteristics of the transistor. The simulation method according to the present embodiment mainly includes a process of preparing information required for the simulation (S110), a process of using the prepared information to calculate the charge density $Q'_T$ of the trapped charges at thermal equilibrium (thermal equilibrium trap charge density) (S120), a process of calculating a transient charge density $q_T$ of the trapped charges (S130), and processes of calculating a charge density $Q'_f$ of the free carrier charges and the drain current $I_d$ using the charge density $q_T$ (S140, S150). Each of the processes S110 to S170 is described below in detail.

In process S110, the information required for the simulation is prepared. Examples of the information include model parameters, TFT element information, terminal voltage information, and the like. The model parameters are parameters such as mobility of the free carrier charges (surface carrier mobility $\mu_d$), a parameter $T_0$ related to the energy distribution of the trapping states, NTC, and the like. The model parameters are modeled in advance on the basis of measured results of the TFT. The TFT element information is information such as the channel length L, the channel width W, the thickness of the gate insulating film, and the like. The terminal voltage information includes the voltage values at the gate electrode, the source, and the drain (gate voltage $V_g$, source voltage $V_s$, and drain voltage $V_d$, respectively). Also, parameters related to simulation time, such as an interval between time steps ($t_i - t_{i-1}$) and an end of time steps (final time step $t_{max}$), are given.

Next, the process S120 that is a process for calculating the charge density $Q'_T$ of the trapped charges at thermal equilibrium (thermal equilibrium trap charge density) is described.

In the process S120, mainly, the charge density of the trapped charges at thermal equilibrium (thermal equilibrium trap charge density) is calculated on the basis of the basic information. Specifically, the thermal equilibrium trap charge density is calculated as the surface charge density $Q'_T$ of the trapped charges. Note that it is possible to calculate the thermal equilibrium trap charge density as the total trap charge density of all regions of the channel.

The calculation process for the thermal equilibrium trap charge density (the surface charge density $Q'_T$) is described below. This calculation process includes a process of calculating the surface potential of the semiconductor layer, and a process of calculating the thermal equilibrium trap charge density (the surface charge density $Q'_T$) on the basis of the surface potential. Note that, in this calculation process, it is possible to simultaneously calculate the surface charge density of the free carrier charges at thermal equilibrium, the drain current, and the like.

Calculation of Surface Potential

Firstly, the surface potential of the semiconductor layer (the channel) is calculated. The surface potential $\phi_s$ is, in short, calculated on the basis of Poisson's equation and the law of charge neutrality. Poisson's equation expresses the relationship between the free carrier charges, the trapped charges, and the electrostatic potential induced in the channel and, in this case, can express this relationship as follows as Equation (1).

Equation 1

$$\nabla^2 \phi(x) = -\frac{1}{\varepsilon}\{Q_T(x) + Q_f(x)\} \quad (1)$$

Here, $\phi(x)$ is the electrostatic potential in the thickness direction (x direction) in the semiconductor layer, and $Q_T(x)$ and $Q_f(x)$ are the respective surface charge densities of the trapped charges and the free carrier charges in the thickness direction (x direction) in the semiconductor layer. Additionally, $\varepsilon$ is the permittivity of the semiconductor layer.

The law of charge neutrality is a physical law stating that, when the gate electrode, the gate insulating film, and the semiconductor layer are regarded as capacitors, the charges charged to the capacitors retain electrical neutrality (equal positive and negative charge quantities are charged), and can be expressed as follows as Equation (2).

Equation 2

$$C_g(V_g - V_{fb} - \phi_s) - \varepsilon\left(\frac{d\phi_s}{dx}\right) = 0 \quad (2)$$

Here, $C_g$ is the capacitance of the gate insulating film, $V_g$ is the gate voltage, $V_{fb}$ is the flat band voltage of the semiconductor layer, and ($d\phi_s/dx$) is the electric field strength, on the semiconductor layer side, at the interface between the gate insulating film and the semiconductor layer.

$Q_T(x)$ and $Q_f(x)$ of Equation 1 are respectively given by Equations (3) and (4) below.

Equation 3

$$Q_T(x) = qNTC(k_B T_0)\left[\exp\left(\frac{q\phi(x)}{k_B T_0}\right) - 1\right] \quad (3)$$

Equation 4

$$Q_l(x) = qn_i\left[\exp\left(\frac{q\phi(x)}{k_B T}\right) - 1\right] \quad (4)$$

Here, q is the quantum of electricity, $k_B$ is the Boltzmann constant, $n_i$ is the intrinsic carrier density of the semiconductor layer, and T is the temperature. $T_0$ and NTC are model parameters related to the energy distribution of the trapping states. Note that the equation expressing the charge density $Q_T(x)$ of the trapped charges is not limited to Equation (3). For example, the charge density $Q_T(x)$ of the trapped charges may be expressed using an analytic function expressed by the sum of two exponential functions with different NTC and $T_0$ values, a constant function that does not depend on the electrostatic potential $\phi(x)$, or the like.

($d\phi_s/dx$) obtained by integrating Equation (1), in which Equations (3) and (4) are substituted, is substituted into Equation (2) to obtain Equation (5) below.

Equation 5

$$C_g\phi_s + F(\phi_s) - C_g(V_g - V_{fb}) = 0 \quad (5)$$

Here, $F(\phi_s)$ is given by Equation (6) below.

Equation 6

$$F(\phi_s) = \sqrt{\left[2q\varepsilon(k_B T_0)^2 NTC\left\{\exp\left(\frac{q\phi(x)}{k_B T_0}\right) - 1 - \left(\frac{1}{k_B T_0}\right)\phi_s\right\} + 2q\varepsilon n_i(k_B T)\left\{\exp\left(\frac{q\phi_s}{k_B T}\right) - 1\right\}\right]} \quad (6)$$

Equations (5) and (6) are basic equations expressing the relationship between the externally given gate voltage $V_g$ and the surface potential $\Phi_s$. These equations are nonlinear equations, and cannot be solved analytically. As such, these equations are solved numerically using the Newton-Raphson method, for example.

For example, surface potentials $\phi_s^0$ and $\phi_{sL}$ at the source side end and the drain side end are calculated by solving these equations at the source side end of the channel (y=0, gate voltage=$V_g$, source voltage=0V) and the drain side end (y=L, gate voltage=$V_g$, drain voltage=$V_d$), respectively.

Calculation of Thermal Equilibrium Trap Charge Density

Firstly, a process for deriving the charge density of the trapped charges (and the free carrier charges) at thermal equilibrium is described.

The drain current of an insulating gate FET including a TFT and a single-crystal MOSFET is given by Equation (7) below.

Equation 7

$$I_d = -\left(\frac{W}{L}\right)\mu_d \int_{V_s}^{V_d} Q'_l(V_c) dV_c \quad (7)$$

Here, $V_c$ is the electrostatic potential of the channel, and is a function of the position y. Additionally, $Q'I(V_c)$ is the surface charge density of the free carrier charges, which is obtained by integrating the free charge density $Q_l(x)$ of the free carrier charges in the depth direction of the semiconductor layer (channel), and is given by Equation (8) below.

Equation 8

$$Q'_l = \int Q_l(x)dx = \int_0^{\phi_s} \frac{qn_i \exp\left(\frac{q\phi(x)}{k_B T}\right)}{\left(\frac{d\phi}{dx}\right)} d\phi = \int_0^{\phi_s} \frac{\varepsilon qn_i \exp\left(\frac{q\phi(x)}{k_B T}\right)}{F(\phi)} d\phi \quad (8)$$

The drain current $I_d$ is formulated by Equation (9) below using Equations (7) and (8).

Equation 9

$$I_d = -\left(\frac{W}{L}\right)\mu_d \int_{V_s}^{V_d} \int_0^{\phi_s} \frac{\varepsilon qn_i \exp\left(\frac{q\phi(x)}{k_B T}\right)}{F(\phi)} d\phi dV_c \quad (9)$$

Equation (9) includes a double integral in the x direction and the y direction, and cannot be solved analytically. Equation (10) is obtained by approximating that the charge quantity (charge density) of the free carrier charges is small compared to the charge quantity (charge density) of the trapped charges, and negligible.

Equation 10

$$F(\phi_s) = \sqrt{2\varepsilon(k_U T_0)^2 NTC \exp\left(\frac{q\phi_s}{k_B T_0}\right)} \quad (10)$$

The surface charge densities $Q'_l$ and $Q'_T$ of the free carrier charges and the trapped charges are formulated by Equations (11) and (12) below by substituting Equation (10) into Equation (8).

Equation 11

$$Q'_I = \left(\frac{2T}{2T_0 - T}\right)qn_i = \sqrt{\left(\frac{\varepsilon}{2qNTC}\right)}\exp = \left\{q\left(\frac{1}{k_BT} - \frac{1}{2k_BT_0}\right)\phi_s\right\} \quad (11)$$

Equation 12

$$Q'_T(\phi_s) = \sqrt{2q\varepsilon(k_BT_0)^2 NTC}\left\{\exp\left(\frac{q\phi_s}{2k_BT_0}\right) - 1\right\} \quad (12)$$

The thermal equilibrium trap charge density $Q'_T$ is calculated by substituting the value of the surface potential $\phi_s$ calculated in the previous process into Equation (12).

Calculation of Drain Current

Here, for the sake of convenience, the calculation process for the drain current $I_d$ is described.

The surface charge densities $Q'I_S$ and $Q'I_D$ of the free carrier charges at the source end and the drain end are respectively formulated by Equations (13) and (14) by substituting, into Equation (11), the surface potentials $\phi_s{}^0$ and $\phi_{sL}$ at the source end and the drain end calculated in the previous process.

Equation 13

$$Q'_{IS} \approx ni\left(\frac{2T}{2T_0 - T}\right)\sqrt{\frac{\varepsilon q}{2NTC}}\exp\left(q\phi_{s0}\left(\frac{1}{k_BT} - \frac{1}{1k_BT_0}\right)\right) \quad (13)$$

Equation 14

$$Q'_{ID} \approx ni\left(\frac{2T}{2T_0 - T}\right)\sqrt{\frac{\varepsilon q}{2NTC}}\exp\left(q\phi_{sL}\left(\frac{1}{k_BT} - \frac{1}{2k_BT_0}\right)\right) \quad (14)$$

The integral for the y direction of the drain current $I_d$ can be solved using the so-called Unified Charge Control Model (UCCM) method (for details, see C. Galup-Montoro and M. C. Schneider, "MOSFET MODELING FOR CIRCUIT ANALYSIS AND DESIGN", Singapore, World Scientific, 2007). As a result, Equation (15) is obtained.

Equation 15

$$I_d = \left(\frac{W}{L}\right)\mu_d\left[\frac{Q'^2_{IS} - Q'^2_{ID}}{2nC_g} - k_BT(Q'_{IS} - Q'_{ID})\right] \quad (15)$$

Here, n is called the "slope factor" and is given by Equation (16) below.

Equation 16

$$n = 1 + \frac{C_T(\phi_s)}{C_g} \quad (16)$$

Here, $C_T$ is calculated by differentiating the surface charge density $Q'_T$ of the trapped charges with respect to the surface potential $\phi_s$, and is given by Equation (17) below.

Equation 17

$$C_T = \frac{\partial Q'_T(\phi_S)}{\partial \phi_S} = \sqrt{2q\varepsilon NTC}\exp\left(\frac{\phi_S}{2k_BT_0}\right) \quad (17)$$

The relational expressions related to the various parameters described above change depending, for example, on the method of approximation, and the relational expressions related to the various parameters may be derived using other methods of approximation. Additionally, other physical factors may be taken into consideration when deriving the relational expressions related to the various parameters.

Next, a description is given of the process S130 that is the process of calculating the transient charge density $q_T$ of the trapped charges (transient trap charge density).

In process S130, the transient charge density of the trapped charges (transient trap charge density) is calculated on the basis of the calculated thermal equilibrium trap charge density (surface charge density) $Q'_T$. Specifically, the transient trap charge density is calculated as the surface charge density $Q_T$ by Equations (18) to (20) below.

Equation 18

$$Q'_T = \sum_{j=1}^{n} Q'^j_T \quad (18)$$

Equation 19

$$q^j_T(t_i) = q^j_T(t_{i-1}) + \frac{t_i - t_{i-1}}{\tau^j_{NQS}}\left[Q'^j_T - q^j_T(t_{i-1})\right] \quad (19)$$

Equation 20

$$q_T(t_i) = \sum_{j=1}^{n} q^j_T(t_i) \quad (20)$$

Next, equation (18) is described.

It is assumed that each of the partial charges, $q_T{}^j(t_i)$, constituting the trapped charges, $q_T(t_i)$, has a different delay time constant, $\tau_{NQS}{}^j$. The delay time constant $\tau_{NQS}{}^j$ is a parameter expressing the time required for a partial charge for filling the trapping states (or, the time required for being released from the trapping states) after the application of voltage to the transistor.

It is assumed that a probability distribution for the delay time constant $\tau_{NQS}$ of the partial charges constituting the trapped charges conforms to the normal lognormal distribution expressed by, for example, Equation (21) below.

Equation 21

$$N_T(u) = \frac{1}{\sqrt{2\pi\sigma^2}}\exp\left(\frac{(u-\mu)^2}{2\sigma^2}\right) \quad (21)$$

Here, $N_T$ is the quantity of partial charges constituting the trapped charges, and u is the logarithm of the delay time constant, $\log(\tau_{NQS})$. Additionally, μ is the mean of this distribution, and σ is the standard deviation. Note that it is preferable to assume that the partial charges constituting the trapped charges are widely distributed with respect to the delay time constant $\tau_{NQS}$, and an assumption may be made that the partial charges constituting the trapped charges conform to a long tail distribution such as the power-law distribution, the Lévy distribution, the Pareto distribution, or the like, in addition to the normal lognormal distribution.

Note that, since each of the partial charges constituting the trapped charges has a charge quantity that corresponds to the quantum of electricity, the distribution may be regarded as a charge quantity distribution of the trapped charges with respect to the delay time constant $\tau$. The entirety (total area) of the charge quantity distribution of the trapped charges with respect to the delay time constant T corresponds to the thermal equilibrium trap charge density $Q'_T$.

The probability distribution function given by equation (21) is a continuous function of $\tau_{NQS}$. For sake of reducing the calculation cost, the probability function is approximated a discrete function as a set of n (where n is an integer equal to or greater than 2) delay time constants $\tau_{NQS}^1$ to $\tau_{NQS}^n$. Here, the quantities of partial charges having the delay time constants $\tau_{NQS}^1$ to $\tau_{NQS}^n$ are defined as $N_T^1$ to $N_T^n$, respectively. Alternatively, proportions (weights), with respect to the whole, of the partial charges having the delay time constants $\tau_{NQS}^1$ to $\tau_{NQS}^n$ may be set as $P^1$ to $P^n$.

The total charge densities of the partial charges having the delay time constants $\tau_{NQS}^1$ to $\tau_{NQS}^n$ are defined as $Q_T^1$ to $Q_T^n$. The charge densities $Q_T^1$ to $Q_T^n$ respectively correspond to the elementary charge q×the quantities of partial charges $N_T^1$ to $N_T^n$, and further correspond to the thermal equilibrium trap charge density $Q'_T$×the weights $P^1$ to $P^n$. This expresses Equation (18) in which the sum of the total charge densities $Q_T^1$ to $Q_T^n$ of the partial charges respectively having the delay time constants $\tau_{NQS}^1$ to $\tau_{NQS}^n$ is equal to the thermal equilibrium trap charge density $Q'_T$.

Next, equation (19) is described. $t_i$ and $t_{i-1}$ respectively represent an ith time (where i is an integer of 1 or greater) and a time prior to the time $t_i$. Additionally, $\tau_{NQS}^j$ is a jth delay time constant (where j is an integer of 1 or greater and n or less) of the delay time constants $\tau_{NQS}^1$ to $T_{NQS}^n$.

$Q_T^j$ is the total charge density of the partial charges that have the delay time constant $T_{NQS}^j$ (the portion of the charge density of the trapped charges at thermal equilibrium). Additionally, $q_T^j(t_i)$ and $q_T^j(t_{i-1})$ are the transient charge densities of the trapped charges at the times $t_i$ and $t_{i-1}$, respectively (the portion of the transient charge density of the trapped charges reflecting the NQS effect).

This relational expression is derived from the model disclosed in Japanese Patent Application Publication No. 2010-171384. This relational expression expresses that the transient charge density $q_T^j$ of the trapped charges converges, with a time delay corresponding to the delay time constant $\tau_{NQS}^j$, toward the charge density $Q_T^j$ at thermal equilibrium of the trapped charges.

Note that, when Equation (19) is integrated under the boundary conditions of the charge density $q_T^j(t_0)$ at time to being 0, and the charge density $q_T^j(t_\infty)$ at time $t_\infty$ being $Q_T^j$, Equation (22) below is obtained. According to this relational expression, the transient charge density $q_T^j$ of the trapped charges decays exponentially with the passage of time (has time dependency on the first-order delay response).

Equation 22

$$q_T^j(t) = Q_T^j \left\{ 1 - \exp\left(-\frac{t}{\tau_{NQS}^j}\right) \right\} \quad (22)$$

Next, equation (20) is described. The transient trap charge density $q_T$ is the sum of the first to nth transient charge densities $q_T^1$ to $q_T^n$ of the trapped charges.

According to Equation (22), the time variance of the jth transient charge density $q_T^j$ of the trapped charges can be expressed by an exponential function that has a single time constant. Therefore, the time variance of the transient trap charge density $q_T$ that is the sum of the first to nth transient charge densities $q_T^1$ to $q_T^n$ of the trapped charges is expressed by a function obtained by superimposing a plurality of exponential functions having the time constants $\tau_{NQS}^1$ to $\tau_{NQS}^n$. By superimposing a plurality of exponential functions in this manner, it is possible to more accurately calculate the real NQS effect (non-quasi static effect).

The model parameters of $Q_T^j$ and $\tau_{NQS}^n$, and the distribution parameters of $\mu$ and $\sigma$ are modeled in advance on the basis of measured results of the TFT element, or the like. Additionally, if the number of divisions n of the trapped charges is exceedingly small, the difference between the simulation results and the measured results increases and, if the number of divisions n is excessively large, the calculation cost increases and more time is required to calculate the simulation results. According to investigations by the present inventors, an appropriate value of n is about from 5 to 10.

Next, a description is given of process S140 that is the process of calculating the transient charge density of the free carrier charges (transient free carrier charge density) $q_I$.

In process S140, the charge density (surface charge density) $q_I$ of the free carrier charges is calculated on the basis of the thermal equilibrium trap charge density (surface charge density) $Q'_T$ and the transient trap charge density (surface charge density) $q_T$. The trapped charges do not directly contribute to the drain current. Accordingly, another equation which relates transient trapped charges to the free carrier charges and, by extension, the drain current is needed.

It is assumed that the NQS effect of the trapped charges affects an increase/decrease of the free carrier charge. Specifically, it is assumed that the amount of charge increase/decrease of the trapped charges, obtained by subtracting the transient trap charge density $q_T$ from the thermal equilibrium trap charge density $Q'_T$, corresponds to the amount of increase/decrease of the free carrier charge. In this case, the transient free carrier charge density (surface charge density) $q_{fl}$ reflecting the NQS effect can be calculated by adding the increase/decrease amount $q_I^{NQS}$ of the free carrier charges expressed by Equation (23) below to the charge density $Q'I$ of the free carrier charges at thermal equilibrium expressed in Equation (11).

Equation 23

$$q_I^{NQS} = Q'_T - q_T(t_i) \quad (23)$$

Alternatively, an assumption may be made that the NQS effect of the trapped charges affects the increase/decrease of the gate charges (the charges charged on the gate electrode). Specifically, an assumption may be made that the amount of increase/decrease of the trapped charges, obtained by subtracting the transient trap charge density $q_T$ from the thermal equilibrium trap charge density $Q'_T$, corresponds to the amount of increase/decrease of the gate charges. In this case, an assumption is made that an effective gate voltage $V_G + \Delta V_g$, obtained by adding a gate voltage change amount $\Delta V_g$ expressed by Equation (24) below to the actual gate voltage $V_G$, is applied to the gate electrode.

Equation 24
$$\Delta V_g(t_i) = \frac{Q'_T - q_T(t_i)}{C_g} \quad (24)$$

It is possible to calculate the charge density (surface charge density) $q_{f2}$ of the free carrier charges reflecting the NQS effect by solving Equations (1) to (11) under the assumption that the effective gate voltage $V_G + \Delta V_g$ is applied to the gate electrode. According to investigations by the present inventors, it is understood that the simulation results obtained using the charge density $q_{f2}$ of the free carrier charges are closer to the measured results than the simulation results obtained using the charge density $q_{f1}$ of the free carrier charges.

Next, a description is given of process S150 that is the process of calculating the drain current $I_d$.

In process S150, the drain current $I_d$ is calculated on the basis of the transient free carrier charge density $q_f$ (charge densities $q_{f1}$ and $q_{f2}$ of the free carrier charges reflecting the NQS effect). Specifically, the drain current $I_d$ is calculated, using Equation (15), on the basis of the charge densities $q_{fS}$ and $q_{fD}$ of the free carrier charges at the source end and the drain end.

In process S160, a determination is made whether the time elapse reaches the end of simulation time which is given in the simulation input card. Specifically, if the time step $t_i$ has reached the final time step $t_{max}$, the simulation is ended. If the time step $t_i$ has not reached the final time step $t_{max}$, the time step is sent to next time step $t_{i+1}$ (process S170), and processes S130 to S150 are repeated.

Thus, the electrical characteristics of the transistor are simulated by the simulation method according to the present embodiment. Next, a comparison is given of the measured results and the simulation results obtained by the simulation method according to the present embodiment. Firstly, descriptions are given of the basic structure and manufacturing method of the p-channel TFT that was measured.

Figure 5:
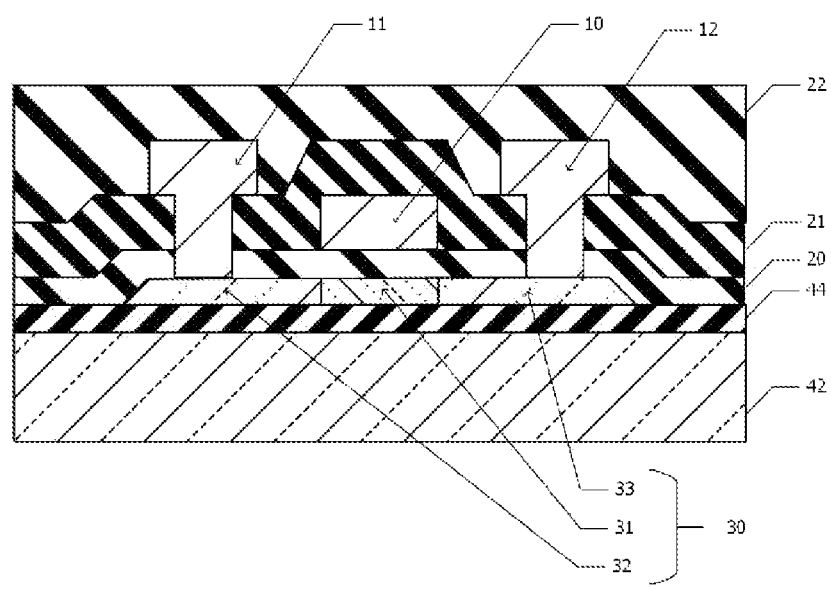
FIG. 5 is a cross-sectional drawing illustrating a fabricated transistor.

FIG. 5 illustrates a schematic cross-sectional view of the measured TFT.

A glass substrate or a resin film is prepared as the substrate 42. An electrically insulating undercoat film 44 is formed on the prepared substrate 42. The undercoat film 44 has a structure in which a silicon oxide film $SiO_2$ and a silicon nitride film SiN are laminated.

The semiconductor layer 30 made from polycrystalline silicon (poly-Si) is formed in a desired pattern on the undercoat film 44. Firstly, an amorphous silicon film is deposited on the undercoat film 44 by a plasma chemical vapor deposition (CVD) method. The amorphous silicon film is irradiated with an excimer laser to crystallize the amorphous silicon film. As a result, a polycrystalline silicon layer having a thickness of about 50 nm, for example, is formed. Thereafter, the polycrystalline layer is molded into a desired pattern by a known photolithography or etching process to obtain the semiconductor layer 30.

The gate insulating film 20 formed from $SiO_2$ is formed on the surface of the semiconductor layer 30 by a plasma CVD method. The thickness of the gate insulating film 20 is about 100 nm.

The gate electrode 10 is formed on the gate insulating film 20 so as to be opposite the channel 31. Firstly, a molybdenum film is deposited on the gate insulating film 20 by a sputtering method. Thereafter, the molybdenum film is molded into a desired pattern by a known photolithography or etching process to obtain the gate electrode 10. The thickness of the gate electrode 10 is about 100 nm.

With the gate electrode 10 as a mask, about $1 \times 10^{15}$ cm$^{-2}$ of boron is implanted into the semiconductor layer 30 by an ion implantation method. Thereafter, heat treatment (activation) at about 500° is carried out, and low resistance p-silicon regions (the source 32 and the drain 33) are formed.

The semiconductor layer 30 includes the source 32 and the drain 33 that are disposed separated from each other, and the channel 31 that is positioned between the source 32 and the drain 33. The channel 31 is not doped with impurities, and has I-type conductivity.

An interlayer insulating film 21 that covers the gate electrode 10 is formed by the plasma CVD method. The interlayer insulating film 21 is formed from $SiO_2$, and has a thickness of about 300 nm.

A source electrode 11 and a drain electrode 12 that respectively connect to the source 32 and the drain 33, are formed so as to penetrate the gate insulating film 20 and the interlayer insulating film 21. Firstly, openings are formed in the gate insulating film 20 and the interlayer insulating film 21 by a known photolithography or etching process. Thereafter, a laminated film is formed by a sputtering method so as to fill in the openings in the gate insulating film 20 and the interlayer insulating film 21. The laminated film has a molybdenum layer/aluminum layer/molybdenum layer structure. The laminated film is molded into a predetermined pattern by a known photolithography or etching process to obtain the source electrode 11 and the drain electrode 12.

A protective insulating film 22 that covers the source electrode 11 and the drain electrode 12 is deposited by the plasma CVD method. The protective insulating film 22 is formed from a silicon nitride film (SiN), and has a thickness of about 250 nm.

Thus, the p-channel TFT is completed. Note that, in a product such as a display or the like, electrodes, insulating films, light emitting elements, and the like necessary for displaying images are further formed on the protective insulating film 22. However, in this case, descriptions of these constituents are omitted.

The present inventors compared the measured results with the simulation results obtained using the simulation method according to the present embodiment for transient response current characteristics (FIG. 6), direct current (DC) characteristics (FIGS. 7 to 10), hysteresis characteristics (FIG. 11), overshoot characteristics and undershoot characteristics (FIG. 12), and history characteristics (FIG. 13) of the p-channel TFT. The results of the comparisons confirm that, for all of the characteristics, the simulation results closely conform to the measured results. Next, a description is given of the comparisons/investigations of the simulation results and the measured results.

Figure 6:
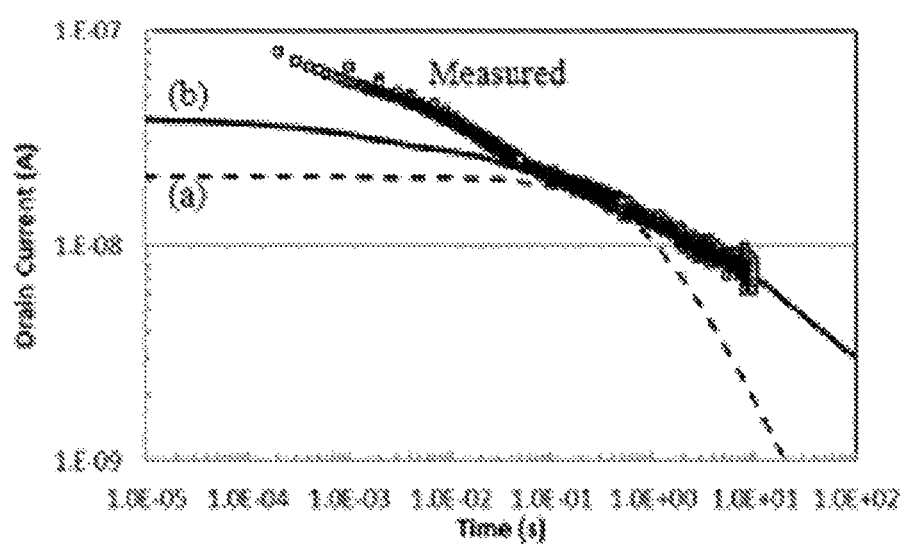
FIG. 6 is a graph illustrating measured results and simulation results related to transient response current characteristics of the transistor.

FIG. 6 illustrates the transient response current characteristics of the p-channel TFT. The vertical axis of the graph illustrated in FIG. 6 corresponds to the logarithm of the drain current $I_d$, and the horizontal axis corresponds to the logarithm of the time t.

In the graph, the measured results (indicated by the dot group labeled "Measured"), and simulation results (a) (indicated by the dashed line) and (b) (indicated by the solid line) are illustrated. The simulation results (a) are results in which the drain current $I_d$ is calculated using the single delay time constant $\tau_{NQS}^{1}$, and the simulation results (b) are results in which the drain current $I_d$ is calculated using the plurality of delay time constants $\tau_{NQS}^{1}$ to $\tau_{NQS}^{7}$. These results illustrate the time variance of the drain current $I_d$ after fixing the drain voltage $V_d$ at −10 V and changing the gate voltage $V_g$ from 0 V to −2 V.

According to the measured results, the drain current $I_d$ has power dependency with respect to the time t ($I_d \propto I_d(0)$ t$^{-\alpha}$). The fit of the simulation results (a) to the measured results is very poor. Meanwhile, the simulation results (b) match the measured results in a longer time range than the simulation results (a). By comparing the simulation results (a) and (b), it is clear that the simulation results obtained using the plurality of delay time constants more accurately captures the real NQS effect (time delay phenomenon). Note that, it is possible to make the simulation results more closely match the measured results by adjusting the parameters other than the delay time constant $\tau$.

Figure 7:
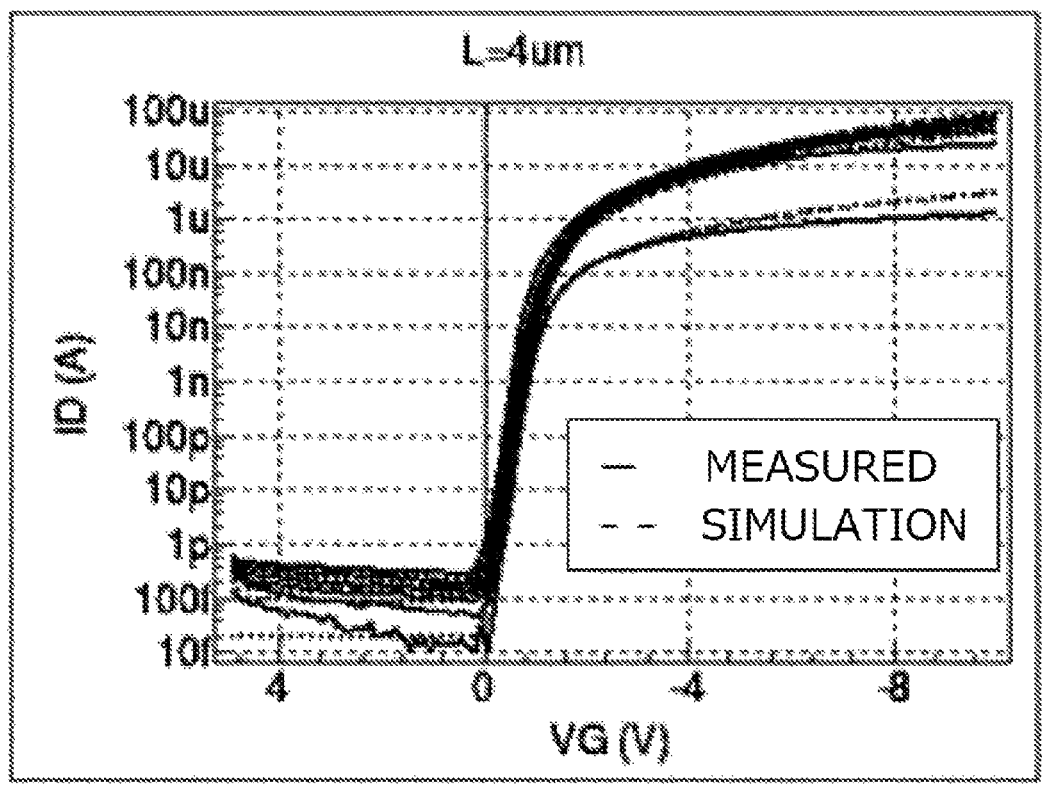
FIG. 7 is a graph illustrating measured results and simulation results related to drain current Id-gate voltage Vg characteristics when a channel length of the transistor is set to 4 μm.
Figure 8:
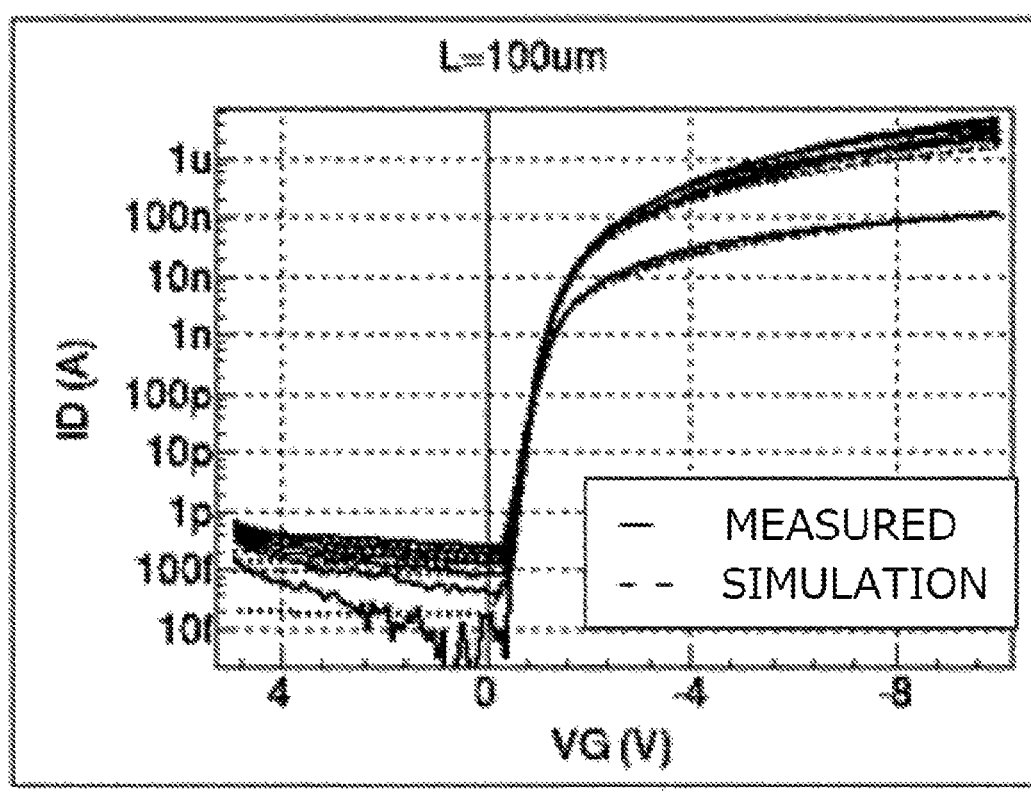
FIG. 8 is a graph illustrating measured results and simulation results related to drain current Id-gate voltage Vg characteristics when the channel length of the transistor is set to 100 μm.
Figure 9:
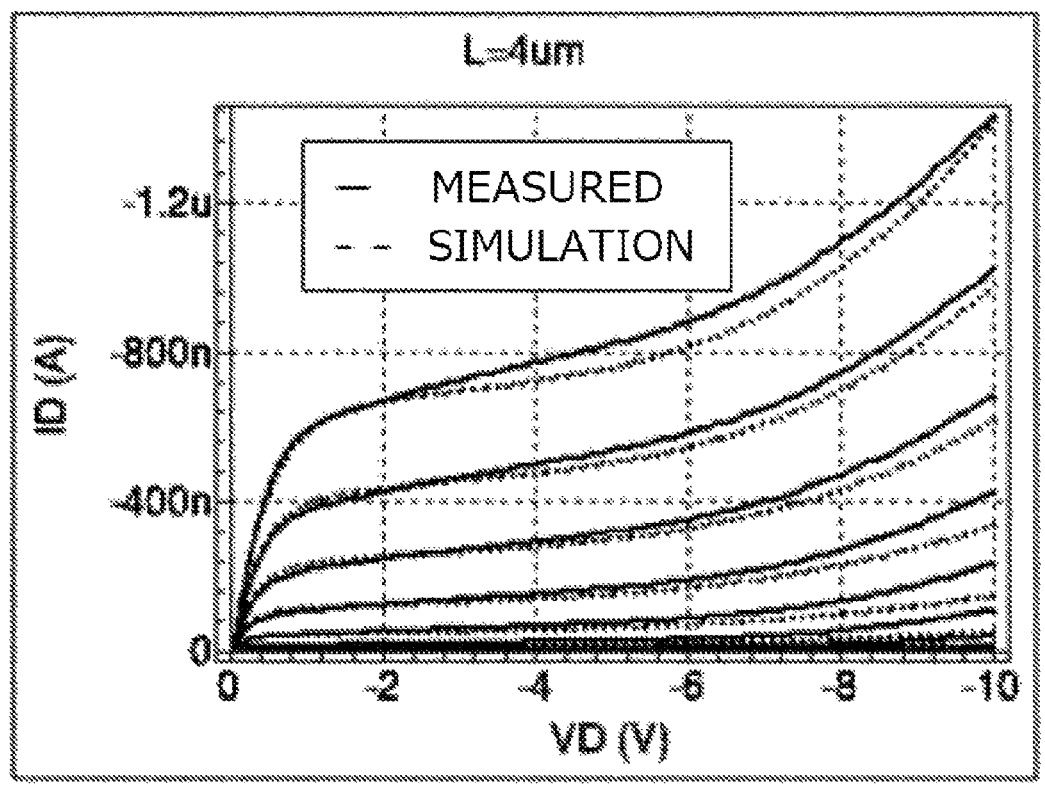
FIG. 9 is a graph illustrating measured results and simulation results related to drain current Id-drain voltage Vd characteristics when the channel length of the transistor is set to 4 μm.
Figure 10:
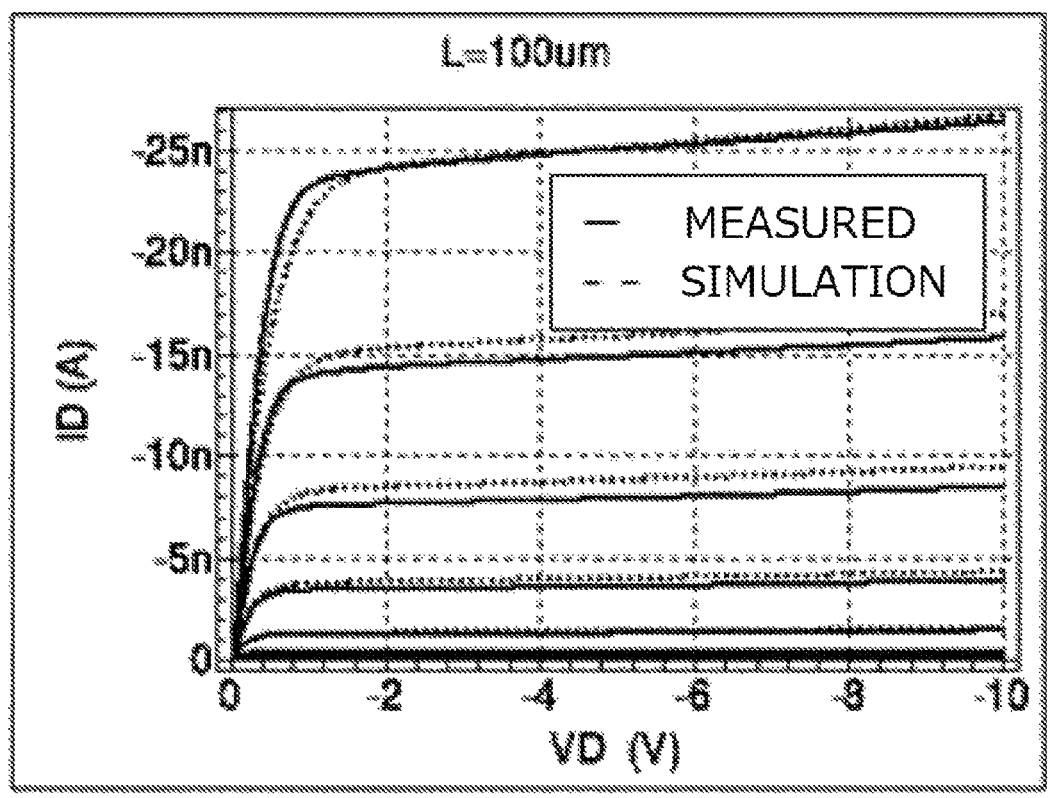
FIG. 10 is a graph illustrating measured results and simulation results related to drain current Id-drain voltage Vd characteristics when the channel length of the transistor is set to 100 μm.

FIGS. 7 to 10 illustrate the direct current (DC) characteristics of the p-channel TFT. FIG. 7 illustrates the drain current $I_d$–gate voltage $V_g$ characteristics when the channel length L is set to 4 μm and the drain voltage $V_d$ is varied. FIG. 8 illustrates the drain current $I_d$–gate voltage $V_g$ characteristics when the channel length L is set to 100 μm and the drain voltage $V_d$ is varied. FIG. 9 illustrates the drain current $I_d$–drain voltage $V_d$ characteristics when the channel length L is set to 4 μm and the gate voltage $V_g$ is varied. FIG. 10 illustrates the drain current $I_d$–drain voltage $V_d$ characteristics when the channel length L is set to 100 μm and the gate voltage $V_g$ is varied. FIGS. 7 to 10 each illustrate the measured results (indicated by the solid line) and the simulation results (indicated by the dashed line).

These graphs confirm that the simulation results conform to the measured results over a wide range of channel lengths. In particular, it is confirmed that the measured results are excellently reproduced in the sub-threshold area where the drain current increases exponentially with respect to the gate voltage $V_g$.

Note that, for the drain current $I_d$ in the sub-threshold area (in particular, the slope of the rise thereof) and the drain current $I_d$ in the ON region, the numerical settings of NTC and $T_0$ of Equation (3), $V_{fb}$ of Equation (5), and the like are particularly important for making the simulation results close to the measured results. In the present simulation, NTC is set to 4.3×10$^{15}$, $T_0$ is set to 1660, and $V_{fb}$ is set to −0.2.

Figure 11:
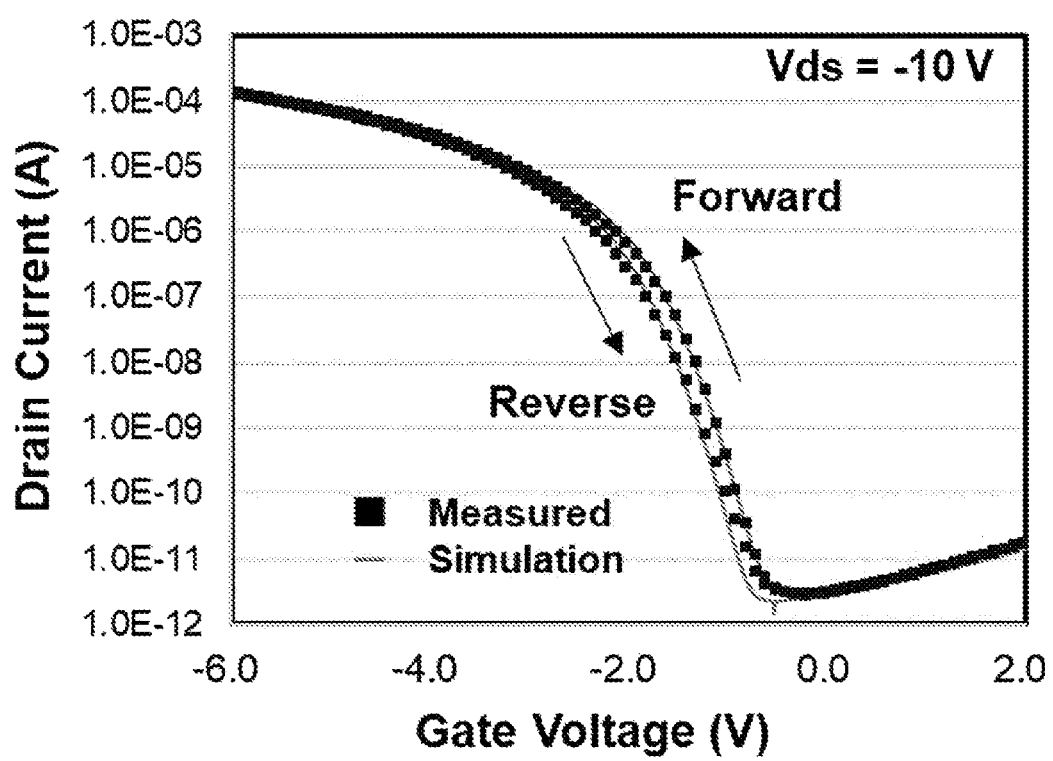
FIG. 11 is a graph illustrating measured results and simulation results related to hysteresis characteristics of the transistor.

FIG. 11 illustrates the hysteresis characteristics of the p-channel TFT. The vertical axis of the graph illustrated in FIG. 11 corresponds to the drain current $I_d$, and the horizontal axis corresponds to the gate voltage $V_g$. In the graph, the measured results (dot group labeled "Measured"), and the simulation results (solid line) are illustrated. These results illustrate the hysteresis characteristics when the drain voltage $V_d$ is set to −10 V and the gate voltage $V_g$ is varied from +2.0 V to −6.0 V at a fall rate of −0.1 V/sec and, then, the gate voltage $V_g$ is further varied from −6.0 V to +2.0 V at a rise rate of 0.1 V/sec. i The process for decreasing the gate voltage $V_g$ is defined as forward sweep, and the process for increasing is defined as reverse sweep. The characteristics curve of the reverse sweep shifts in the negative direction of the gate voltage $V_g$ with respect to the characteristics curve of the forward sweep. This is a phenomenon that is commonly observed in TFTs made from poly-Si or amorphous Si.

This graph confirms that the simulation results closely reproduce the measured results. Note that, for the hysteresis characteristics, the numerical settings of μ and σ of Equation (21) are particularly important for making the simulation results close to the measured results. In the present simulation, μ is set to 3.7 and σ is set to 1.0.

Figure 12:
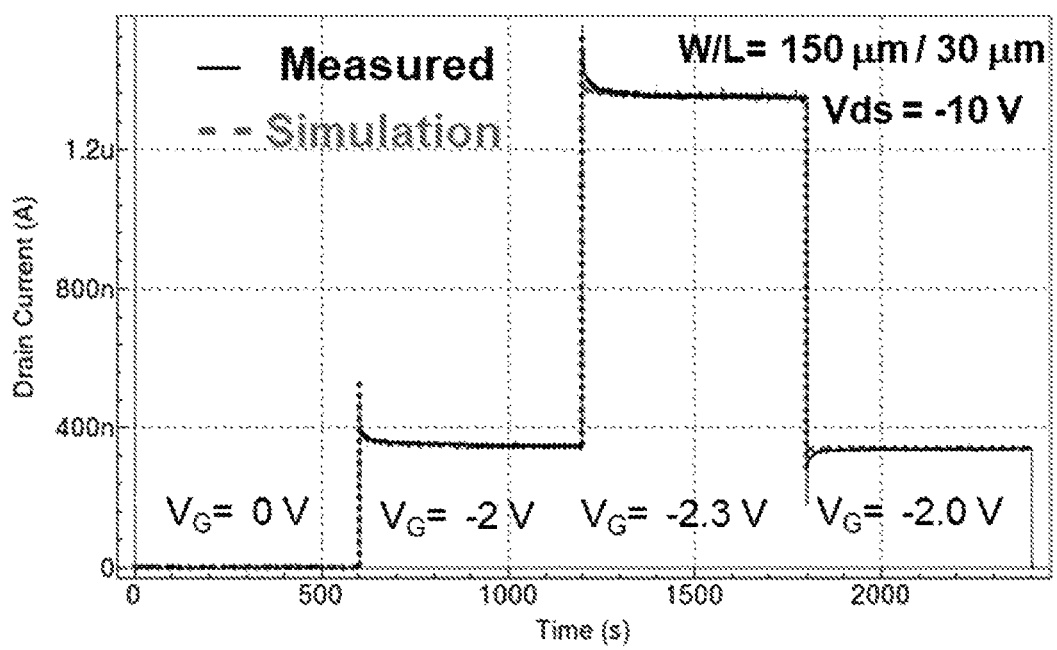
FIG. 12 is a graph illustrating measured results and simulation results related to overshoot characteristics and undershoot characteristics of the transistor.

FIG. 12 illustrates the overshoot characteristics and the undershoot characteristics of the p-channel TFT. The vertical axis of the graph illustrated in FIG. 12 corresponds to the drain current $I_d$, and the horizontal axis corresponds to the time t. In the graph, the measured results (solid line), and the simulation results (dot group labeled "Simulation") are illustrated. These results illustrate the time change of the drain current $I_d$ when the drain voltage $V_d$ is fixed at −10 V and the gate voltage $V_g$ is changed from 0 V to −2.0 V, −2.3 V, and −2.0 V.

According to the measured results, an overshoot of the drain voltage $I_d$ is confirmed when the gate voltage $V_g$ is changed from 0 V (OFF potential) to −2.0 V (intermediate potential). Additionally, an undershoot of the drain voltage $I_d$ is confirmed when the gate voltage $V_g$ is changed from −2.3 V (ON potential) to −2.0 V (intermediate potential). This graph confirms that the simulation results closely conform to the measured results.

Note that, for the overshoot characteristics and the undershoot characteristics, the numerical settings of μ and σ of Equation (21) are particularly important for making the simulation results close to the measured results. As in the simulation illustrated in FIG. 11, in the present simulation, μ is set to 3.7 and σ is set to 1.0.

Figure 13A:
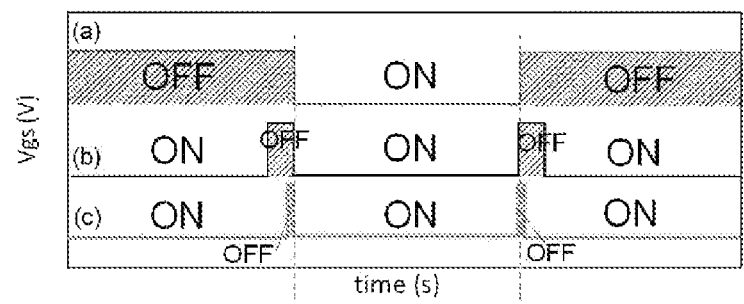
FIG. 13A is a graph illustrating a voltage waveform to be applied to the transistor.
Figure 13B:
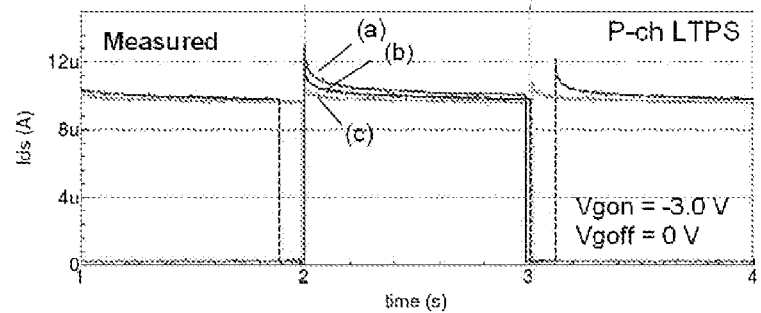
FIG. 13B is a graph illustrating measured results related to history characteristics of the transistor.
Figure 13C:
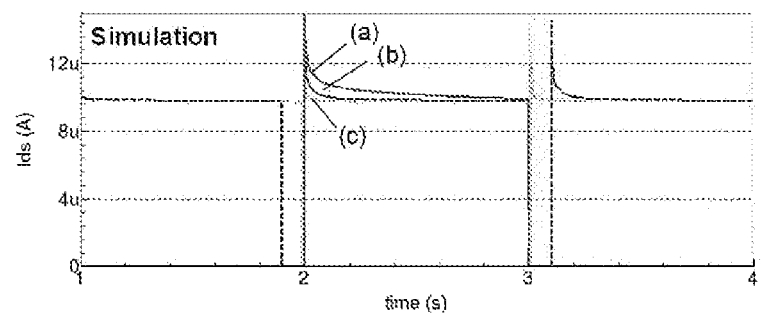
FIG. 13C is a graph illustrating simulation results related to the history characteristics of the transistor.

FIGS. 13A to 13C illustrate the history characteristics of the p-channel TFT. The history characteristics are characteristics in which the size of the overshoot of the TFT depends on the OFF time of the gate voltage.

FIG. 13A illustrates the time variance of the gate voltage (the voltage waveform applied to the gate electrode). FIG. 13B illustrates the time variance of the drain current according to the measured results. FIG. 13C illustrates the time variance of the drain current according to the simulation results.

As illustrated in FIG. 13A, in case (a), a voltage of −3.0 V is applied for one second to the gate electrode and, then, the gate voltage is turned OFF (0 V) for one second. In case (b), a voltage of −3.0 V is applied for one second to the gate electrode and, then, the gate voltage is turned OFF for 0.1 seconds. In case (c), a voltage of −3.0 V is applied for one second to the gate electrode and, then, the gate voltage is turned OFF for 0.01 seconds.

FIG. 13B illustrates the measured results of cases (a) to (c). It is confirmed in FIG. 13B that the characteristics of the overshoot of the drain current increase as the OFF time of the gate voltage lengthens. That is, FIG. 13B confirms the history characteristics of the TFT.

FIG. 13C illustrates the simulation results of cases (a) to (c). The history characteristics of the overshoot of the drain current increasing as the OFF time of the gate voltage lengthens are reproduced. Physically, when the OFF time is not sufficiently long, the trapped charges cannot return to thermal equilibrium defined as the OFF voltage (gate voltage=0 V) and, as such, it can be interpreted that $Q'_T - q_T(t_i)$ will decrease and the current overshooting range will decrease in Equations (23) and (24).

As described above, it is understood that the transient response characteristics of the TFT can be reproduced with high accuracy due to the transient behavior of the trapped charges being considered in the simulation method according to the present embodiment. Such characteristics are extremely useful for simulating the transient characteristics of electronic circuits that include TFTs.

For example, in an organic EL device, TFTs are typically used to drive the pixels constituting the display surface. The overshoot characteristics and the undershoot characteristics of the TFT illustrated in FIG. 12 significantly affect the image quality (afterimages and the like) of these displays. Due to the simulation method according to the present embodiment, the overshoot characteristics and the undershoot characteristics of the TFT can be accurately predicted and, as a result, the image quality of the display can be evaluated and studied in advance (at the design stage) with higher precision.

Next, a description is given of a simulation of the characteristics of an electronic circuit including an organic light emitting diode (organic EL element). In this case, the simulation method (the compact model of the transistor) according to the present embodiment is used.

Figure 14:
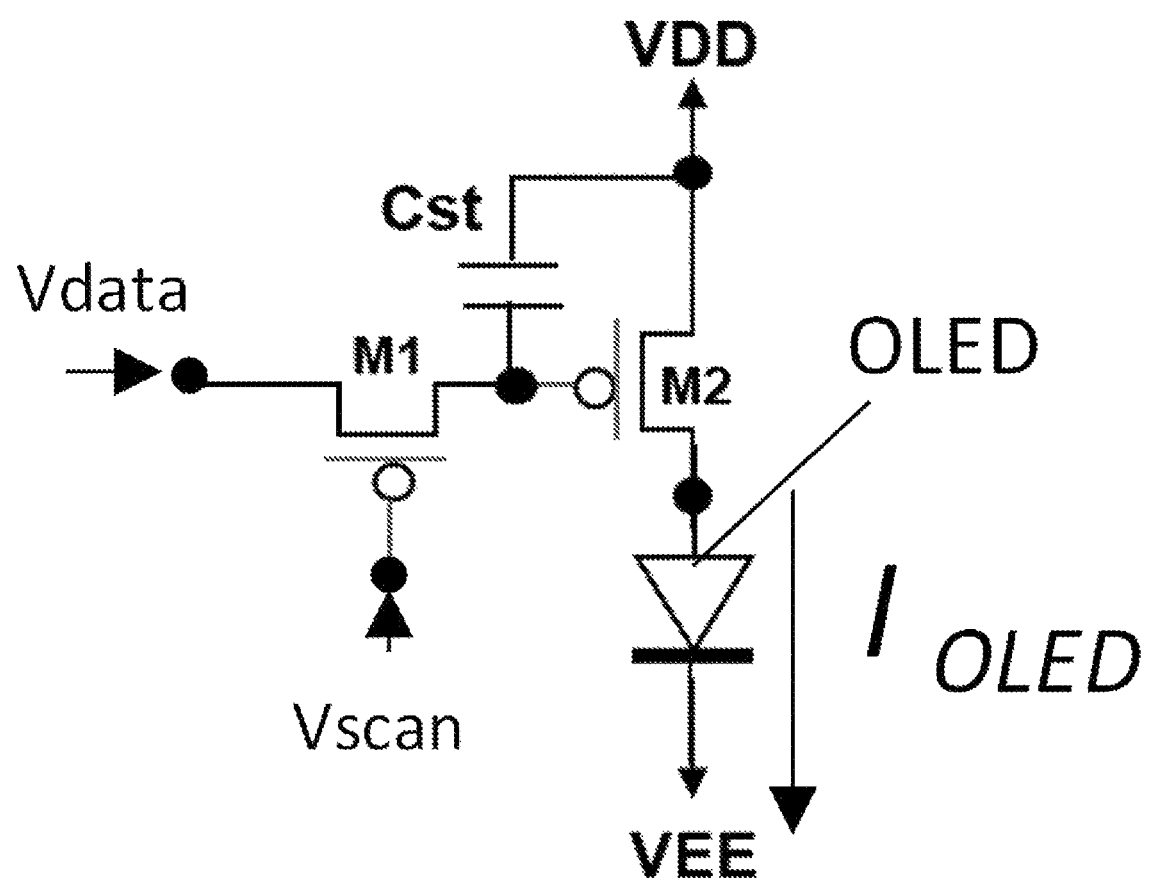
FIG. 14 is an equivalent circuit corresponding to a display device.

FIG. 14 illustrates, in a simplified manner, an equivalent circuit of an organic EL display that includes TFTs. This equivalent circuit includes two p-channel thin film transistors M1 and M2, a capacitor Cst, and an organic light emitting diode element OLED. A data voltage Vdata is input into the drain of the transistor M1, and a scan voltage Vscan is input into the gate. When the transistor M1 is turned ON, charges are maintained on the capacitor Cst that is connected to the source of the transistor M1. The gate of the transistor M2 is also connected to the source of the transistor M1 and a current $I_{OLED}$ flowing through the organic light emitting diode element OLED is controlled in accordance with the voltage state of the transistor M2. VDD is set to +5 V, and VEE is set to −5 V.

Figure 15A:
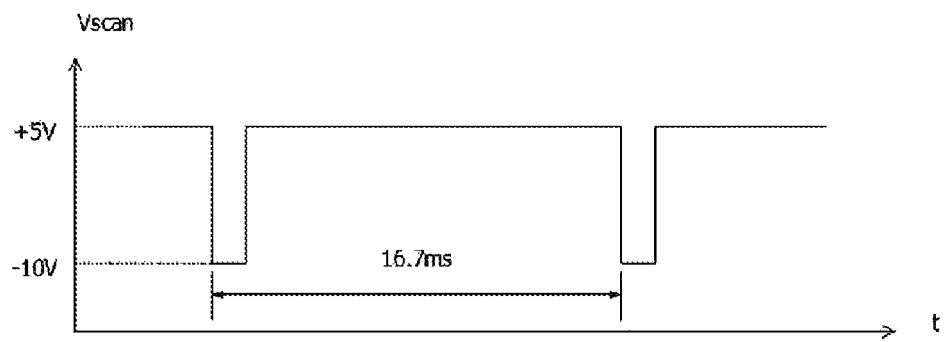
FIG. 15A and FIG. 15B are, respectively, graphs illustrating voltage waveforms of Vscan and Vdata input into the equivalent circuit representing the display device.
Figure 15B:
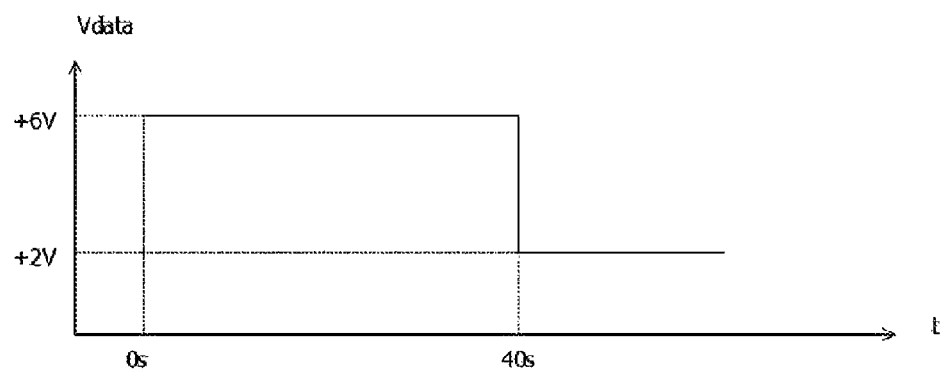

FIGS. 15A and 15B illustrate signal waveforms of the voltage Vscan and the voltage Vdata. Vscan has a pulse waveform with a cycle of 16.7 ms. Vdata has a step voltage waveform in which the voltage changes from 6 V to 2 V at the time 40 s. The current $I_{OLED}$ flowing through the organic light emitting diode element OLED substantially does not flow from times 0 s to 40 s, and gradually begins to flow from the time 40 s.

FIGS. 16A and 16B, and FIGS. 17A and 17B illustrate the electrical characteristics of the equivalent circuit illustrated in FIG. 14.

Figure 16A:
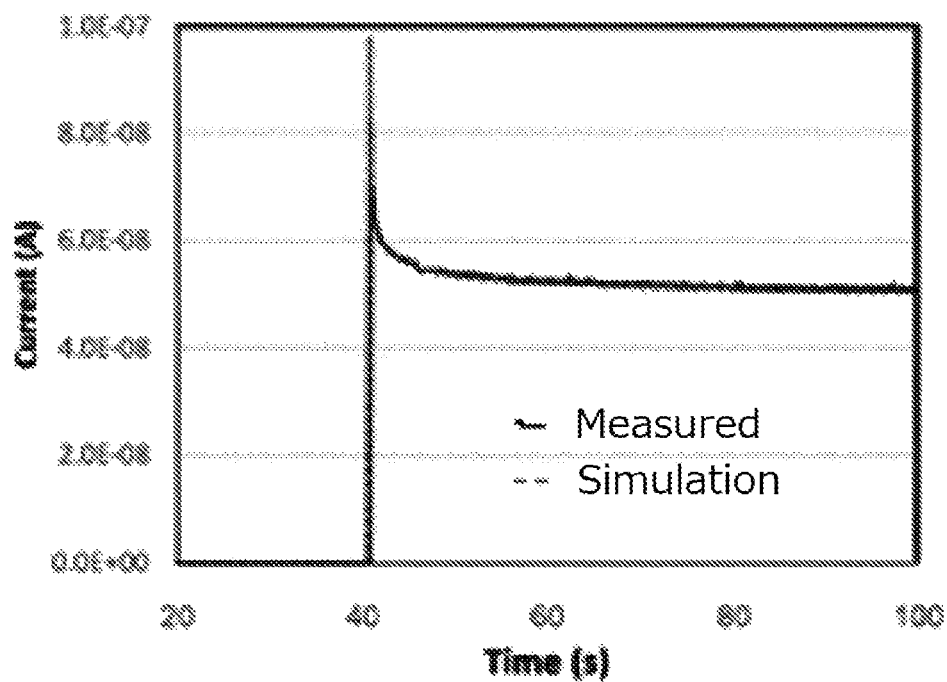
FIG. 16A is a graph illustrating measured results related to electrical characteristics of the equivalent circuit of the display device, and simulation results according to a simulation method using a plurality of time constants.
Figure 16B:
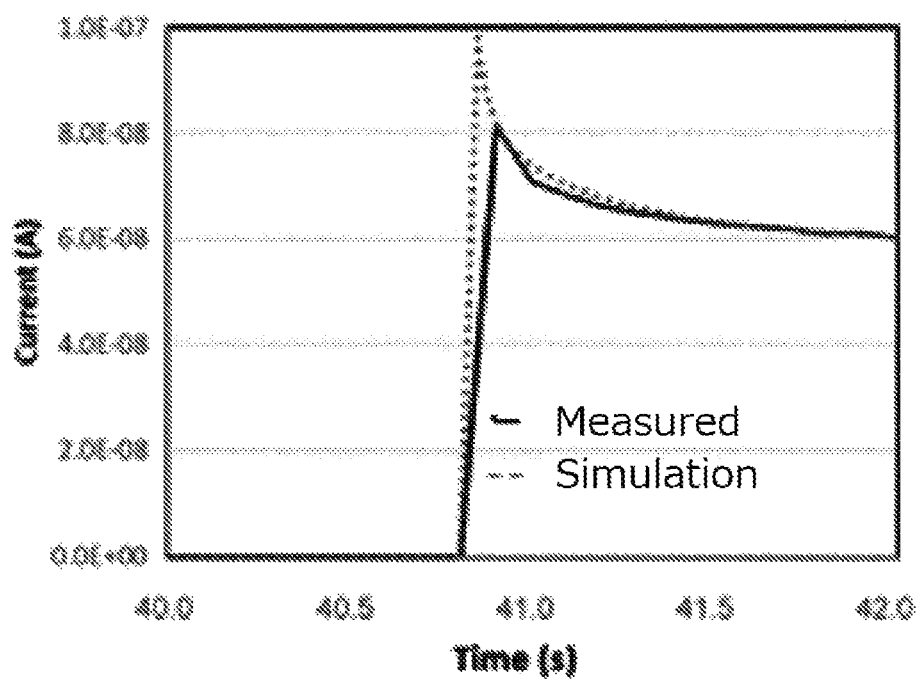
FIG. 16B is a graph obtained by enlarging a portion of the graph of FIG. 16A.

FIG. 16A illustrates the time variance of the current $I_{OLED}$ flowing in a wide time range, and FIG. 16B illustrates, in an enlarged manner, the time variance of the current $I_{OLED}$ near the time 40 s. FIG. 16A and FIG. 16B respectively illustrate the simulation results (indicated by the dashed line) and the measured results (indicated by the solid line) obtained using a plurality of delay time constants in the calculation of the transient trap charge density $q_T$.

Figure 17A:
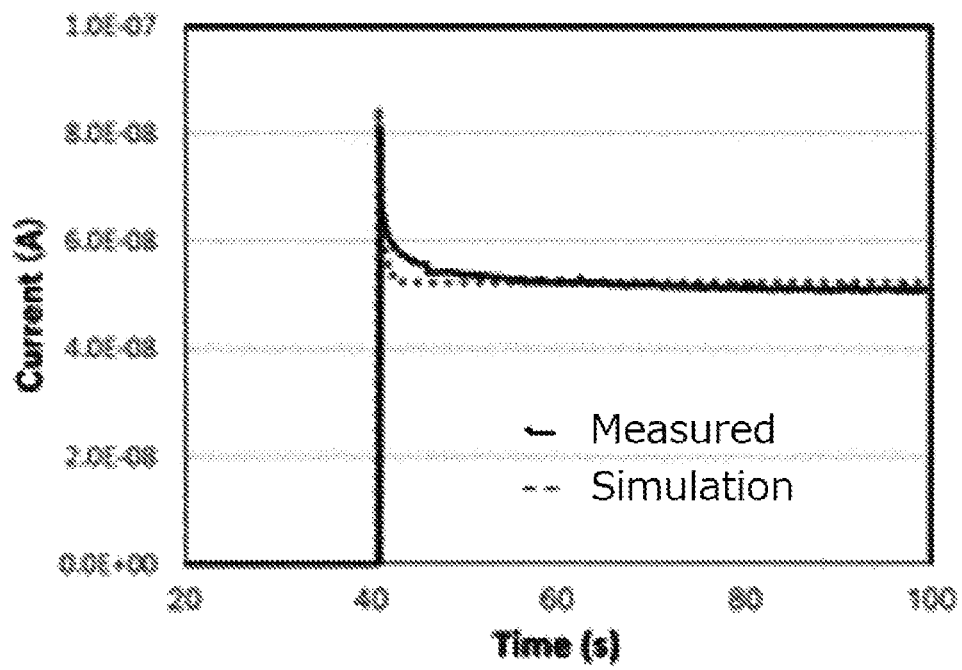
FIG. 17A is a graph illustrating measured results related to the electrical characteristics of the equivalent circuit of the display device, and simulation results according to a simulation method using a single time constant.
Figure 17B:
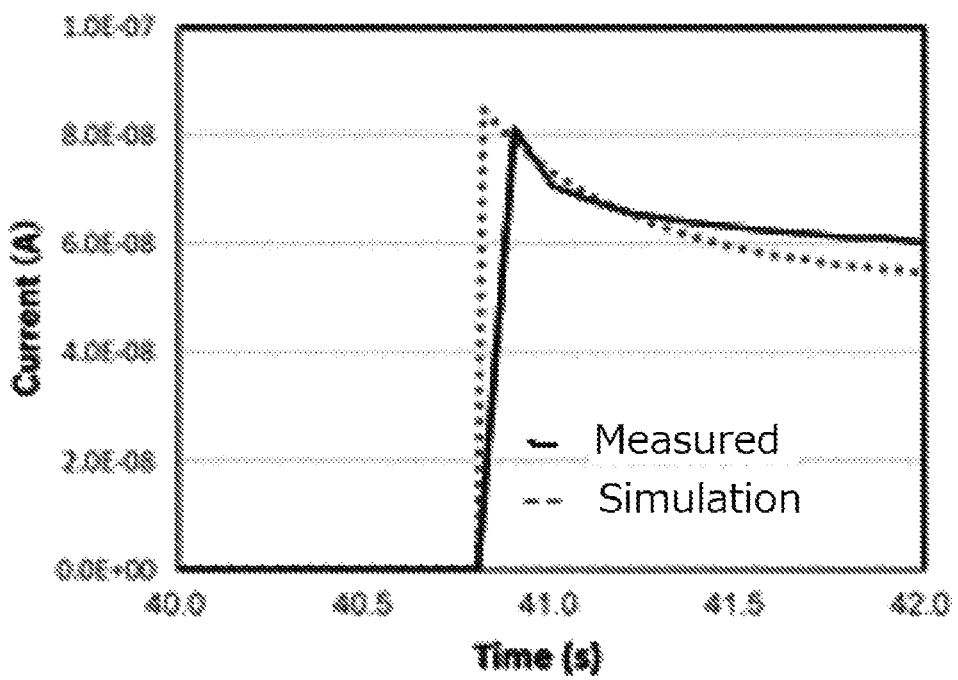
FIG. 17B is a graph obtained by enlarging a portion of the graph of FIG. 17A.

Likewise, FIG. 17A illustrates the time variance of the current $I_{OLED}$ flowing in a wide time range, and FIG. 17B illustrates, in an enlarged manner, the time variance of the current $I_{OLED}$ near the time 40 s. FIG. 17A and FIG. 17B respectively illustrate the simulation results (indicated by the dashed line) and the measured results (indicated by the solid line) obtained using a single delay time constant in the calculation of the transient trap charge density $q_T$.

Based on FIG. 16A and FIG. 16B, it can be said that the simulation results are sufficiently close to the measured results in both the wide time range and the narrow time range. Meanwhile, based, on FIG. 17A and FIG. 17B, while it can be said that the simulation results are close to the measured results in the narrow time range, it cannot be said that the simulation results are sufficiently close to the measured results in the wide time range. Considering these results, it is clear that the simulation using the plurality of delay time constants more accurately captures the real NQS effect (time delay phenomenon).

An embodiment according to the present disclosure is described above, but the present disclosure is not limited by this embodiment. In the embodiment, a description is given of a method for simulating a p-channel TFT that uses a poly-Si film as a semiconductor layer. However, the present simulation method can also be applied to an n-channel TFT. Additionally, the semiconductor layer is not limited to poly-Si. For example, it is possible to apply the present simulation method to a semiconductor layer that has trapping states in the semiconductor layer (in the channel), such as amorphous silicon, microcrystalline silicon, metal oxide semiconductors such as InGaZnO, and organic semiconductors. Moreover, it would be obvious to a person skilled in the art that other various changes, modifications, combinations, and the like are possible.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A design method for characteristics of a pixel circuit of a display device through simulation, the pixel circuit including at least a light emitting element and a transistor that controls a current flowing in the light emitting element, the transistor including a semiconductor layer that includes a source and a drain that are separated from each other and a channel positioned between the source and the drain, and a gate electrode facing the channel of the semiconductor layer, wherein a model parameter predetermined at least based on a measured result of the transistor is set by an input device, wherein, the input device is caused to set a mathematical model equation including a process (a) of calculating a thermal equilibrium trap charge density $Q'_T$, based on the Poisson's equation expressing a relationship between an electrostatic potential inside the channel and charges including free carrier charges and trapped charges trapped in trapping states in the channel, and on the law of charge neutrality applied to charges accumulated on the gate electrode and the channel;

a process (b) of calculating a transient trap charge density $q_T$ after applying a voltage between the gate electrode and the semiconductor layer, in which assuming that a time variance of the transient trap charge density $q_T$ is expressed by a function obtained by superimposing multiple exponential functions having mutually different time constants;

a process (c) of calculating a free carrier charge density $q_I$, based on the transient trap charge density $q_T$; and a process (d) of calculating a drain current $I_d$ flowing between the source and the drain, based on the free carrier charge density $q_I$, and wherein the subprocesses below are set to the process (b) of the mathematical model equation:

a subprocess (b1) of determining n delay time constants $\tau_{NQS}^1$ to $\tau_{NQS}^n$ corresponding to the time constants included in the exponential functions, and charge densities $Q_T^1$ to $Q_T^n$ of partial charges constituting the trapped charges having the delay time constants $\tau_{NQS}^1$ to $\tau_{NQS}^n$, respectively, where n is an integer of 2 or greater, based on a probability distribution of the partial charges constituting the trapped charges, the probability variable of which is delay time constant corresponding time required for the partial charges constituting the trapped charge to be trapped in the trapping states, and a subprocess (b2) of calculating the transient trap charge density $q_T$ based on the delay time constants $\tau_{NQS}^1$ to $\tau_{NQS}^n$ of the trapped charges and the charge densities $Q_T^1$ to $Q_T^n$ of the trapped charges, and wherein the design method includes simulating, by an analog electronic circuit simulator, a transient response characteristic of the current flowing in the transistor in the pixel circuit based on the mathematical model equation, and displaying, by an output device, a result of the simulation of the analog electronic circuit simulator.

2. The design method according to claim 1, wherein when an ith time is $t_i$, where i is an integer of 1 or greater, a time prior to the time $t_i$ is $t_{i-1}$, a jth delay time constant of the delay time constants $\tau_{NQS}^1$ to $\tau_{NQS}^n$ is $\tau_{NQS}^j$, where j is an integer of 1 or greater and n or less, and a jth quantity of the charge densities $Q_T^1$ to $Q_T^n$ of the trapped charges is $Q_T^j$, a charge density $q_T(t_i)$ of the trapped charges at the time $t_i$ is calculated by equations below in the subprocess b2

Equation 1

$$Q'_T = \sum_{j=1}^{n} Q_T^j$$

Equation 2

$$q_T^j(t_i) = q_T^j(t_{i-1}) + \frac{t_i - t_{i-1}}{\tau_{NQS}^j}\left[Q_T^j - q_T^j(t_{i-1})\right]$$

Equation 3

$$q_T(t_i) = \sum_{j=1}^{n} q_T^j(t_i).$$

3. The design method according to claim 1, wherein in the subprocess (b1), the probability distribution conforms to any of the lognormal distribution, the power-law distribution, the Levy distribution, and the Pareto distribution.

4. The design method according to claim 1, wherein in process (c), the free carrier charge density $q_f$ is calculated assuming that an amount of increase/decrease of the trapped charges obtained by subtracting the transient trap charge density $q_T$ from the thermal equilibrium trap charge density $Q'_T$ corresponds to an amount of increase/decrease of gate charges charged on the gate electrode.

5. The design method according to claim 1, wherein the semiconductor layer is a non-single-crystal semiconductor layer.

6. The design method according to claim 1, wherein the pixel circuit further includes an organic EL element that is driven by the transistor.

7. A non-transitory recording medium that stores a program for designing characteristics of a pixel circuit of a display device through simulation, the program including at least an analog electronic circuit simulator, the pixel circuit including at least a light emitting element and a transistor that controls a current flowing in the light emitting element, the transistor including a semiconductor layer that includes a source and a drain that are separated from each other and a channel positioned between the source and the drain, and a gate electrode facing the channel of the semiconductor layer, wherein a model parameter predetermined at least based on a measured result of the transistor is set by an input device, the program causing a computer to execute:

causing the input device to set a mathematical model equation including a step (a) of calculating a thermal equilibrium trap charge density $Q'_T$, based on the Poisson's equation expressing a relationship between an electrostatic potential inside the channel and charges including free carrier charges and trapped charges trapped in trapping states in the channel, and on the law of charge neutrality applied to charges accumulated on the gate electrode and the channel;

a step (b) of calculating a transient trap charge density $q_T$ after applying a voltage between the gate electrode and the semiconductor layer, in which assuming that a time variance of the transient trap charge density $q_T$ is expressed by a function obtained by superimposing multiple exponential functions having mutually different time constants;

a step (c) of calculating a free carrier charge density $q_f$, based on the transient trap charge density $q_T$; and a step (d) of calculating a drain current $I_d$ flowing between the source and the drain, based on the free carrier charge density $q_f$, wherein the subprocesses below are set to the step (b) of the mathematical model equation:

a substep (b1) of determining n delay time constants $\tau_{NQS}^1$ to $\tau_{NQS}^n$ corresponding to the time constants included in the exponential functions, and charge densities $Q_T^1$ to $Q_T^n$ of partial charges constituting the trapped charges having the delay time constants $\tau_{NQS}^1$ to $\tau_{NQS}^n$, respectively, where n is an integer of 2 or greater, based on a probability distribution of the partial charges constituting the trapped charges, the probability variable of which is delay time constant corresponding time required for the partial charges constituting the trapped charge to be trapped in the trapping states, and a substep (b2) of calculating the transient trap charge density $q_T$ based on the delay time constants $\tau_{NQS}^1$ to $\tau_{NQS}^n$ of the trapped charges and the charge densities $Q_T^1$ to $Q_T^n$ of the trapped charges, wherein the program further causing the computer to execute a simulation of a transient response characteristic of the current flowing in the transistor in the pixel circuit based on the mathematical model equation, and displaying, by an output device, a result of the simulation.

* * * * *